(12) United States Patent
Campbell et al.

(10) Patent No.: US 6,388,026 B1
(45) Date of Patent: *May 14, 2002

(54) PROCESS FOR THE PREPARATION OF MACROMERS

(75) Inventors: J. David Campbell, Racine, WI (US); Michihiro Kaai, Toyoake (JP); David D. Schatz, Racine, WI (US); Fouad Teymour, Mt. Prospect, IL (US)

(73) Assignee: S. C. Johnson Commercial Markets, Inc., Sturtevant, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/906,141

(22) Filed: Aug. 5, 1997

(51) Int. Cl.⁷ .......................... C08F 20/18; C08F 20/56; C08F 12/08

(52) U.S. Cl. .................... 526/64; 526/88; 526/307.7; 526/318.4; 526/320; 526/328; 526/328.5; 526/329.2; 526/329.5; 526/329.7; 526/346

(58) Field of Search ............................ 526/64, 88, 328, 526/328.5, 329.7, 307.7, 318.4, 320, 329.2, 329.5, 346

(56) References Cited

U.S. PATENT DOCUMENTS

| | | | |
|---|---|---|---|
| 2,593,399 A | * | 4/1952 | Park |
| 3,040,013 A | * | 6/1962 | Kuhn |
| 3,466,269 A | * | 9/1969 | Fivel |
| 4,117,235 A | * | 9/1978 | Taylor |
| 4,276,432 A | * | 6/1981 | Rhum |
| 4,414,370 A | | 11/1983 | Hamielec et al. ............. 526/88 |
| 4,529,787 A | | 7/1985 | Schmidt et al. ............. 526/317 |
| 4,546,160 A | | 10/1985 | Brand et al. ................. 526/320 |
| 4,600,755 A | | 7/1986 | Das et al. ...................... 526/81 |
| 4,680,352 A | | 7/1987 | Janowicz et al. ........... 526/147 |
| 5,028,677 A | | 7/1991 | Janowicz ................. 526/329.7 |
| 5,100,980 A | | 3/1992 | Hughes et al. ................ 526/91 |
| 5,147,952 A | | 9/1992 | Mori et al. .................. 526/220 |
| 5,268,437 A | | 12/1993 | Holy et al. .................. 526/229 |
| 5,324,879 A | | 6/1994 | Hawthorne .................. 585/511 |
| 5,362,826 A | | 11/1994 | Berge et al. ................. 526/194 |
| 5,576,386 A | * | 11/1996 | Kempter |
| 5,587,431 A | | 12/1996 | Gridnev et al. ............. 525/269 |
| 5,710,227 A | | 1/1998 | Freeman et al. |

FOREIGN PATENT DOCUMENTS

| | | |
|---|---|---|
| EP | 687690 | 12/1995 |
| GB | 2284425 | 7/1995 |
| JP | 60133007 | 7/1985 |
| JP | 62232408 | 10/1987 |
| JP | 01268709 | 10/1989 |
| JP | 04119526 | 4/1992 |
| JP | 05247117 | 9/1993 |
| JP | 05287010 | 11/1993 |
| WO | 9633224 | 10/1996 |

OTHER PUBLICATIONS

USPTO Classification Schedule, Dec. 1996.*

* cited by examiner

*Primary Examiner*—David J. Buttner
(74) *Attorney, Agent, or Firm*—Renee J. Rymarz; Neil E. Hamilton; Warren R. Bovee

(57) ABSTRACT

A process for preparing low molecular weight homomacromers and comacromers which includes (a) charging a reactor with (i) ethylenically unsaturated monomers selected from the group consisting of acrylic monomers or monoalkenyl aromatic monomers and (ii) if said ethylenically unsaturated monomer is not a thermally initiating monomer, a free radical polymerizable initiator, to form a polymerizable reaction charge. The reaction charge is heated during continuous mixing in the reactor to reaction temperature in the range from about 180° C. to about 500° C. for a residence time greater than 5 minutes to form the low molecular weight homomacromers or comacromers. If the residence time is 60 minutes or less, the reaction temperature is greater than 270° C. and if the reaction charge is a mixture of acrylic monomer and monoalkenyl monomer and the residence time is 60 minutes or less then the reaction temperature is greater than 310° C.

13 Claims, 2 Drawing Sheets

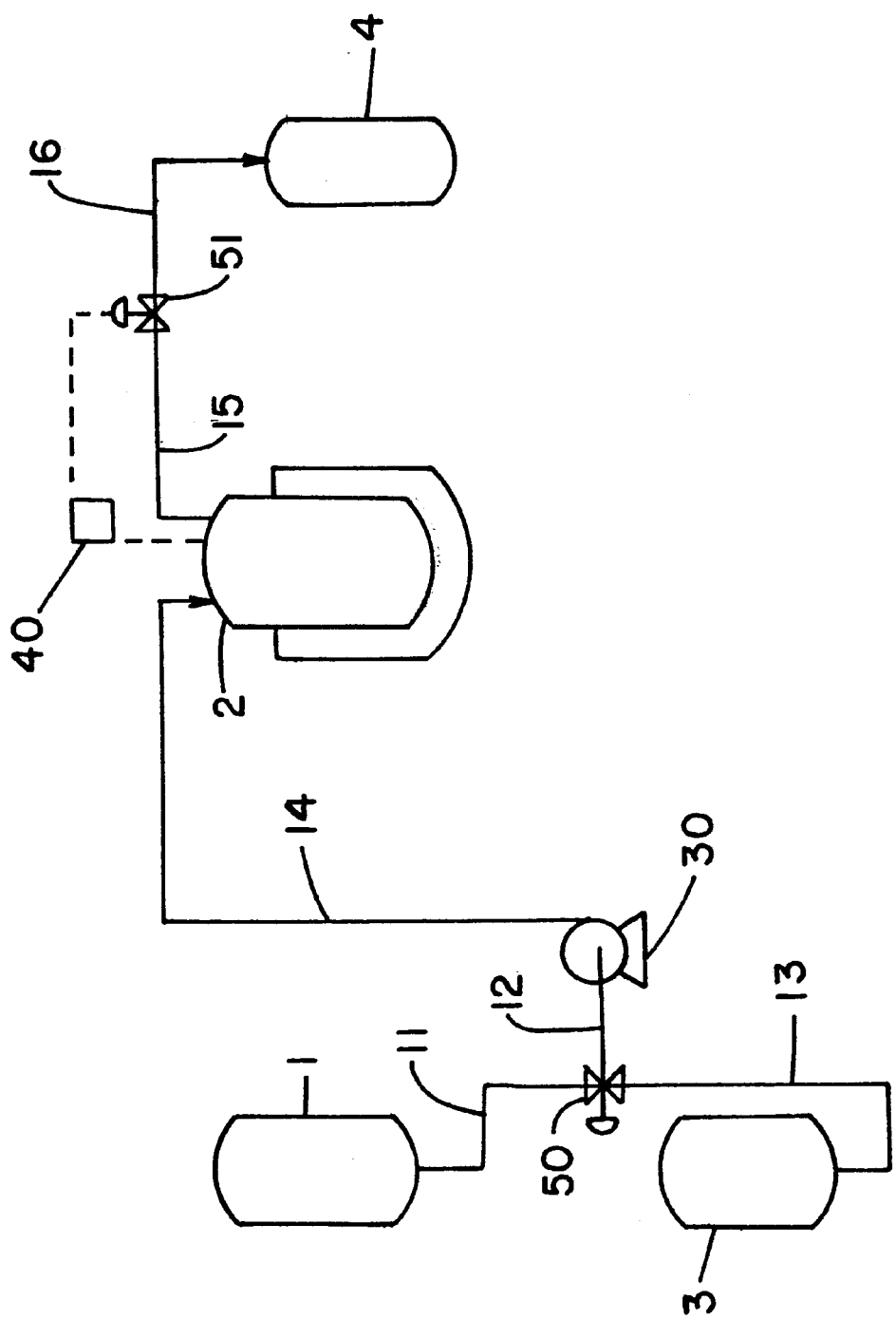

PROCESS FOR THE PREPARATION OF MACROMERS

BACKGROUND OF THE INVENTION

1. Field of the Invention

This invention relates to a process for polymerization of monoalkenyl aromatic monomers and/or acrylic monomers at temperatures and residence times that produce low molecular weight homomacromers or comacromers having terminal unsaturation.

2. Related Background Art

Polymerization of ethylenically unsaturated monomers at moderate temperatures to produce low molecular weight polymers is known in the art. U.S. Pat. No. 4,529,787 describes a process for polymerizing mixtures of monoalkenyl aromatic monomers and acrylic monomers in the temperature range from 180° C. to 270° C., with a residence time from 2–60 minutes. The same temperature range is employed in the method described in U.S. Pat. No. 4,546,160 for polymerization of mixtures containing only acrylic monomers. In this reference, the residence time varies from 1–30 minutes. Both of temperatures above 270° C. leads to adverse effects on the products, for example, discoloration, oxidation, depolymerization, and side reactions.

The methods of the aforementioned references employ free radical polymerization initiators. This is typical of most known methods for production of low molecular weight polymers. For example, monoethylenically unsaturated carboxylic acids, such as acrylic acid, may be converted to low molecular weight polymers in aqueous solution in the presence of an initiator, as described in U.S. Pat. No. 5,268,437. This method employs temperatures in the range from 130° C. to 240° C. Another method for production of low molecular weight acrylic and hydroxyl-containing polymers is described in U.S. Pat. No. 4,600,755. This method requires use of aqueous hydrogen peroxide as an initiator at temperatures above 140° C. Copper salts are used as initiators for production of low molecular weight polymers of monoethylenically unsaturated carboxylic acids and esters in U.S. Pat. No. 5,100,980.

The production of low molecular weight oligomers using cobalt chain transfer agents is also well known. For example, U.S. Pat. No. 4,680,352 describes the use of Co(II) chain transfer agents to control the molecular weight of free radical polymerization of acrylic and/or styrene monomers. The preparation of macromers that are both copolymers and homopolymers using specific cobalt (II) chelates as catalytic chain transfer agents is described in U.S. Pat. No. 5,028,677. Suitable reaction temperatures are said to be between about 50° C. and 150° C. The preparation of terminally unsaturated monomers using such cobalt-containing chelate transfer agents is described in U.S. Pat. No. 5,587,431. The process temperatures are said to range from room temperature to 200° C. or higher, but preferably between about 40° C. and 100° C. U.S. Pat. No. 5,324,879 describes the preparation of oligomers using cobalt (III) chain transfer agents and exemplifies reaction temperatures between 60° C. and 95° C.

Other types of chain transfer agents have also been employed. Japanese Patent Publication No. 62-232408 describes the preparation of an acrylic polymer having a functional group on one terminal by heating a mixture of an acrylic monomer, a functional group chain transfer agent and a polymerization initiator to about 75° C. in an inert atmosphere followed by addition to a corresponding polymerization system to form a polymer having a number average molecular weight of 1000 to 30,000. Macromers prepared using ω-unsaturated oligomer as a chain transfer agent are described in U.S. Pat. No. 5,362,826. Reaction temperatures of 20° C. to 200° C. are said to be suitable.

Other various techniques for preparing macromers have also been employed. Japanese Patent Publication No. 60-133007 describes the preparation of a macromer obtained by reacting a polymer containing a carboxyl group derived from mercaptopropionic acid at one end and a glycidyl group-containing monomer in the presence of a catalyst. Macromers prepared with a monomer unit having an —$SO_3M$ functional group, wherein M is alkali metal or ammonium, are described in Japanese Patent Publication No. 05-247117, Japanese Patent Publication No. 04-119526 and Japanese Patent Publication No. 05-287010. A macromer containing a carboxyl group in the main chain and a vinyl-polymerizable functional group solely on the chain terminal end is described in Japanese Patent Publication No. 01-268,709. U.S. Pat. No. 5,147,952 is directed to the preparation of macromers by anionic polymerization of methacrylic acid ester monomer using a specific polymerization initiator.

Thermally-initiated polymerization, in which a free-radical polymerization process is initiated by heating rather than by addition of initiators, has been used to prepare low molecular weight polymers from ethylenically unsaturated monomers. U.S. Pat. No. 4,414,370 describes a thermally-initiated polymerization process for preparing low molecular weight polymers in a continuous reactor, at temperatures from 235° C. to 310° C., with a residence time of at least 2 minutes. This reference suggests that polymerization at temperatures above 310° C. leads to adverse effects on the products, for example, discoloration, oxidation, depolymerization, and side reactions. Copolymerization of monoalkenyl aromatic monomers with acrylic monomers are disclosed. However, polymerization of either type of monomer alone under these conditions is not exemplified.

Higher temperatures are employed in the polymerization process described in European Patent Application EP 687,690. This reference describes the use of a temperature range of 250° C. to 500° C. for polymerization of acrylic acid in the presence of at least one initiator, with optional addition of other acrylate monomers or monoalkenyl aromatic monomers, to produce low molecular weight polymers with terminal unsaturation, also referred to as macromers. However, the residence time is limited to the range from 0.1 seconds to 5 minutes. Polymerizations at these temperatures for longer residence times are said to be undesirable because the yield of terminally unsaturated oligomers will be decreased without substantially affecting molecular weight or monomer conversion to polymer.

A process for polymerization of acrylic monomers and/or monoalkenyl aromatic monomers at high temperatures or long residence times which provide low molecular weight homomacromers and polymacromers having terminal unsaturation would be highly desirable.

SUMMARY OF THE INVENTION

This invention is directed to a process for preparing low molecular weight macromers, i.e., homomacromers and comacromers, having terminal unsaturation.

In one embodiment, homomacromers are prepared by the process comprising the steps of (a) charging a reactor with (i) a single ethylenically unsaturated monomer selected from the group consisting of acrylic monomers or monoalkenyl aromatic monomers and (ii) if said ethylenically unsaturated monomer is not a thermally initiating monomer, a free radical polymerization initiator, to form a polymerizable reaction charge; and (b) heating the reaction charge during continuous mixing in the reactor to a reaction temperature in the range from about 180° C. to about 500° C. for a residence time greater than 5 minutes to form the low molecular weight homomacromers, provided that if the residence time is 60 minutes or less that the reaction temperature is greater than 270° C.

Yet another embodiment is directed to the preparation of comacromers by (a) charging a reactor with (i) at least two ethylenically unsaturated monomers selected from the group consisting of acrylic monomers, monoalkenyl aromatic monomers or mixtures thereof and (ii) if at least one of said ethylenically unsaturated monomers is not a thermally initiating monomer, a free radical polymerization initiator, to form a polymerizable reaction charge; and (b) heating the reaction charge during continuous mixing in the reactor to a reaction temperature in the range from about 180° C. to about 500° C. for a residence time greater than 5 minutes to form the low molecular weight comacromers, provided that if the residence time is 60 minutes or less that the reaction temperature is greater than 270° C. and further provided that if the reaction charge is a mixture of acrylic monomer and monoalkenyl monomer and the residence time is 60 minutes or less then the reaction temperature is greater than 310° C. Preferably the reaction temperature of the process of this invention is greater than 270° C., more preferably greater than 310° C.

The macromers prepared by the process of this invention, are terminally unsaturated, and thus are useful, for example, as monomers in additional polymerization reactions. The polymers that result from such additional polymerization reactions are useful in adhesives, coating compositions and the like.

BRIEF DESCRIPTION OF THE DRAWINGS

FIG. 2 is a schematic diagram showing yet another reactor and support equipment for use in the process of this invention.

DETAILED DESCRIPTION OF THE INVENTION

Figure 1:
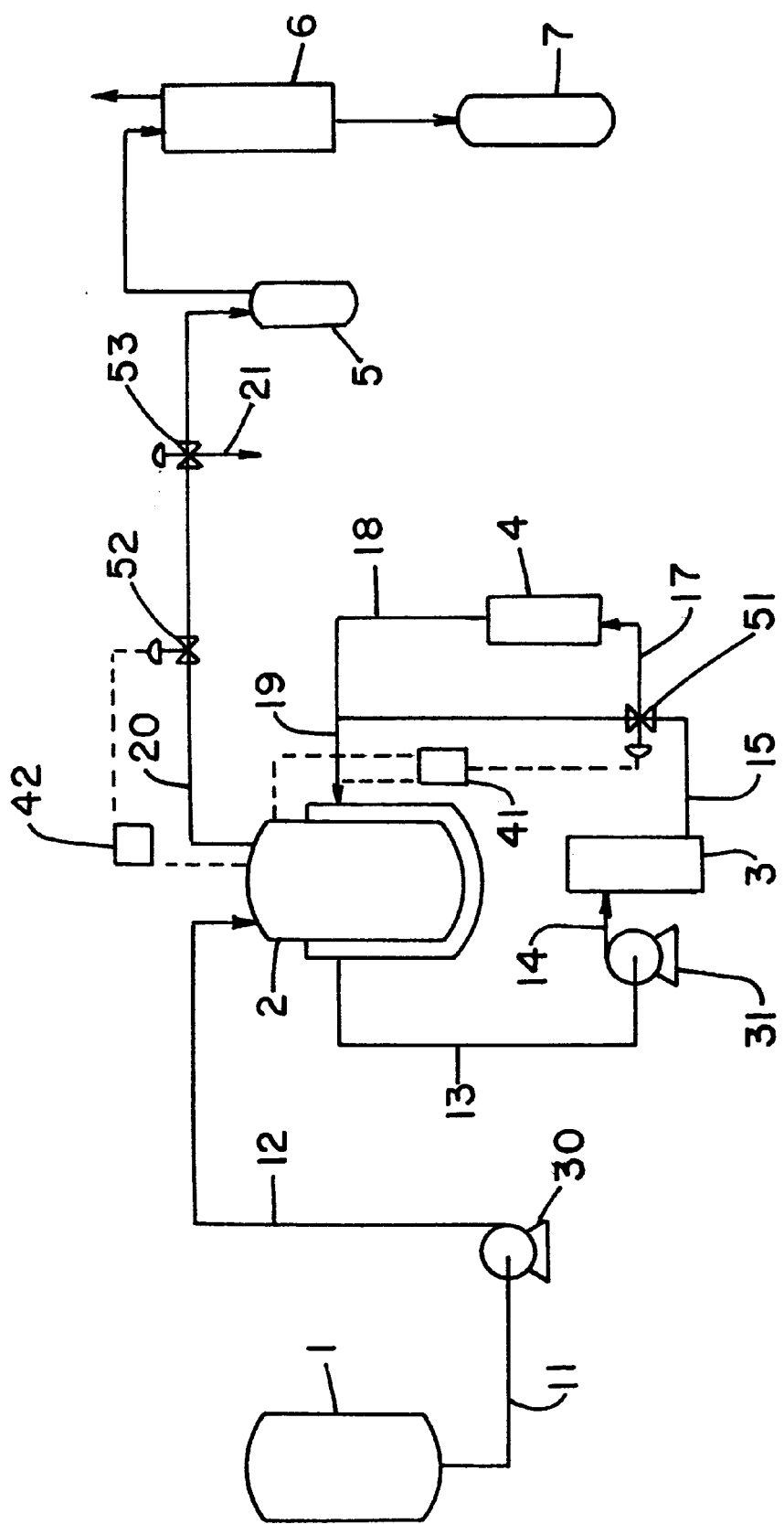
FIG. 1 is a schematic diagram showing a reactor and support equipment that may be employed in the process of this invention.

The method of this invention produces macromers, which are polymers with terminal ethylenic unsaturation. These macromers may be homomacromers of comacromers. The term "homomacromer" describes a homopolymer having a terminal double bond, while the term "comacromer" describes a copolymer having a terminal double bond. These macromers may be characterized by parameters well known to those skilled in the art: number average molecular weight ($M_n$), weight average molecular weight ($M_w$), polydispersity (PD), and double bonds per chain (DB/chain). PD is defined in the conventional way as $M_w/M_n$. DB/chain is defined in terms of the double bond equivalent weight DBEQ (iodine number) as $M_n$/DBEQ. Number average polymerization degree ($P_n$) is calculated by dividing $M_n$ by the molecular weight of the monomer.

The macromers prepared by the process of this invention generally have an $M_n$ in a range from about 300 to about 5000, most preferably about 300 to about 1500. The DB/chain of the macromers prepared by the process of this invention typically have a value in a range from about 0.3 to about 1.2, preferably about 0.7 to about 1, most preferably about 1.

The term "acrylic monomer" as employed herein encompasses, for example, acrylates and methacrylates which include respectively, acrylic or methacrylic acid, and esters, salts, derivatives, and mixtures thereof. Examples of suitable acrylic monomers include, but are not limited to acrylic acid, methyl acrylate, ethyl acrylate, n-propyl acrylate, isopropyl acrylate, n-butyl acrylate, 2-ethylhexyl acrylate, n-decyl acrylate, 2-hydroxyethyl acrylate, methacrylic acid, methyl methacrylate, ethyl methacrylate, n-propyl methacrylate, isopropyl methacrylate, n-butyl methacrylate, isobutyl methacrylate, sec-butyl methacrylate, tert-butyl methacrylate, n-amyl methacrylate, isoamyl methacrylate, n-hexyl methacrylate, 2-ethylhexyl methacrylate, benzyl methacrylate, 2-n-butoxyethyl methacrylate, 2-chloroethyl methacrylate, allyl methacrylate, cyclohexyl methacrylate, 2-hydroxyethyl methacrylate, 2-hydroxypropyl methacrylate, N,N-dimethylaminoethyl methacrylate, N,N-diethylaminoethyl methacrylate, acrylamide, N-ethylacrylamide, N,N-diethylacrylamide, methacrylamide, N-methylmethacrylamide, N-ethylmethacrylamide, N,N-dimethylmethacrylamide, N,N-diethylmethacrylamide, 3-chloro-2-hydroxy-propylacrylate, 2-hydroxy-butyl acrylate, 6-hydroxyhexyl acrylate, 2-hydroxymethyl methacrylate, 2-hydroxypropyl methacrylate, 6-hydroxyhexyl methacrylate, 5,6-dihydroxyhexyl methacrylate, methyl-α-chloroacrylate, methyl 2-cyanoacrylate, N-ethylacrylamide, N,N-diethylacrylamide, t-butylaminoethyl methacrylate, 2-sulfoethyl methacrylate, trifluoroethyl methacrylate, 2-ethylbutyl methacrylate, cinnamyl methacrylate, cyclopentyl methacrylate, 2-ethoxyethyl methacrylate, furfuryl methacrylate, hexafluoroisopropyl methacrylate, 3-methoxybutyl methacrylate, 2-methoxybutyl methacrylate, 2-nitro-2-methylpropyl methacrylate, n-octyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate acrylonitrile and the like. Preferred acrylate and methacrylate monomers include butyl acrylate, hexyl acrylate, acrylic acid, methacrylic acid, 2-hydroxyethyl acrylate, 2-hydroxyethyl methacrylate, isopropyl acrylate and the like.

The acrylic monomer can also include acrylates or methacrylates containing cross-linkable functional groups, such as hydroxy, carboxyl, amino, cross-linkable isocyanate, glycidyl, epoxy, allyl, and the like. Such functional groups may be introduced to the macromers prepared by the process of this invention by the use of such functional monomers or by post reacting a macromer with techniques well known to those skilled in the art, e.g., esterification or transesterification.

The term "monoalkenyl aromatic monomer" as employed herein includes aromatic compounds substituted by a single alkenyl group. Examples of suitable monoalkenyl aromatic monomers include, but are not limited to styrene, α-methylstyrene, vinyltoluene, tert-butylstyrene, 2-chlorostyrene, para-methylstyrene and the like. Preferred monoalkenyl aromatic monomers are styrene and α-methylstyrene.

The term "ethylenically unsaturated monomer" as employed herein includes monoalkenyl aromatic monomers and acrylic monomers. If desired during preparation of a comacromer, other types of monomers that have ethylenic unsaturation may be included in the reaction mixture. For example, vinyl acetate, vinyl pyridine, vinyl pyrollidone, methyl crotonate, crotonic acid and maleic anhydride.

Typically, the ethylenically unsaturated monomer, or mixture of monomers is present in the reaction charge at a level of from about 60 to about 100% by weight, most preferably about 90 to about 100% by weight of the reaction charge. The reminder of the reaction charge may include, for example, solvents and, if necessary, initiators.

In the preparation of a comacromer, the monoalkenyl aromatic monomers and acrylic monomers may be mixed in any ratio that provides the desired properties sought in the resulting macromer. When mixed, the weight ratio of monoalkenyl aromatic monomers to acrylic monomers is generally in the range of about 0.001:100 to about 100:0.001, preferably about 1:100 to about 100:1.

The process of this invention employs either relatively high reaction temperatures or long residence times to obtain macromers having terminal unsaturation. Generally, the longer the residence time the lower the reaction temperature may be.

For a homomacromer, if the reaction temperature is between about 180° C. to about 270° C., the residence time is greater than 60 minutes, preferably in a range between about 60 to about 120 minutes. If the reaction temperature used to prepare a homomacromer is greater than 270° C. the residence time is greater than 5 minutes, preferably in a range between about 10 to about 45 minutes. A particularly preferred reaction temperature range for the preparation of a homomacromer is between about 275° C. to about 500° C., more preferably between about 300° C. to about 400° C. and most preferably between about 315° C. to about 350° C.

In the preparation of a comacromer, if the reaction temperature is between 180° C. and 270° C. then the residence time is greater than 60 minutes, preferably greater than 75 minutes and most preferably in a range between about 75 to about 180 minutes. If the reaction temperature used to prepare comacromer is greater than 270° C. then the residence time is greater than 5 minutes preferably in a range of about 10 to 45 minutes, with the exception that if the reaction charge is a mixture of an acrylic monomer and a monoalkenyl monomer then the reaction temperature must be greater than 310° C. if the residence time is 60 minutes or less. A particularly preferred reaction temperature range for the preparation of comacromers is between about 315° C. to about 500° C., more preferably between about 315° C. to about 400° C., and most preferably between about 315° C. to about 350° C.

Without being bound to theory, it is believed that the high reaction temperatures and/or long residence times employed in the method of this invention favor polymer chain β-scission reactions over chain termination reactions. In the case of β-scission reactions, a terminally ethylenically unsaturated polymer results. Termination reactions do not result in production of reactive terminal double bonds. Thus, high temperatures or longer residence times favor production of polymers with terminal double bonds, and a value for DB/chain that is near 1.

For reaction mixtures containing monoalkenyl aromatic monomers, i.e., thermally initiating monomers, the reaction is generally carried out in the substantial absence of polymerization initiators. It is believed that the absence of initiators also favors production of double bonds over chain termination. However, in certain embodiments of this invention it may be desirable to employ polymerization initiators, particularly when the level of thermally initiating. monomers, such as styrene, are relatively low in the reaction mixture. The initiators suitable for carrying out the process of this invention are compounds which decompose thermally into radicals. Suitable initiators preferably have half-life periods in the radical decomposition process from about 1 hour to about 10 hours in the temperature range from about 90° C. to about 100° C. Others with about 10 hour half-lives at temperatures significantly lower than 100° C. may also be used. Suitable initiators are, for example, aliphatic azo compounds such as 1-tert-amylazo-1-cyanocyclohexane, azo-bis-isobutyronitrile, and 1-tert-butylazocyanocyclohexane and peroxides and hydroperoxides, such as tert-butylperoctoate, tert-butylperbenzoate, dicumyl peroxide, di-tert-butyl peroxide (DTBP), tort-butyl hydroperoxide (TBHP), cumene hydroperoxide, and the like. The initiator is preferably added simultaneously with the monomers. For this purpose, it is either mixed with the monomer feed or added to the process as a separate feed. If used, the initiator is typically present in an amount in a range of about 0% to about 10% by weight of the monomer mixture.

If desired, from about 0 to 40 percent and preferably from about 0 to 10 percent reaction solvent may be employed in the polymerization process of this invention. The solvent, when employed, may be added to the reactor prior to the addition of the monomer feed, or simultaneously with the ethylenically unsaturated monomer feed or added to the reactor as a separate feed. The selection of the particular solvent and its level of addition may be made based on the monomers employed, the ultimate use for the prepared macromer as well as to assist in controlling the reaction parameters.

Most conventional polymerization or reaction solvents may be utilized in the present process to prepare the low molecular weight polymers of the instant invention. The solvent employed should be selected to ensure that the solvent system is compatible with the monomer or monomers used under the reaction conditions, i.e., the solvent should impart adequate solvency to avoid substantial polymer precipitation. The higher boiling solvents may be used due to their low pressure at high temperature. Examples of such higher boiling solvents include the aromatic alcohols, such as benzyl alcohol, the toluene alcohols and the like; the alcohol and glycol ethers, esters and mixed ethers and esters, such as diethylene glycol, "Cellosolve" (registered trademark of the Union Carbide Corporation, Danbury, Conn. (ethylene glycol monoethyl ether), butyl Cellosolve (ethylene glycol monobutyl ether), Cellosolve acetate (ethylene glycol monoethyl ether acetate), "Carbitol" (registered trademark of the Union Carbide Corporation) (diethylene glycol monoethyl ether), the glymes, e.g., ethylene glycol dimethyl ether, and the diglymes, e.g., "Diglyme" (registered trademark of I.C.I. (England) London, England) (diglycol methyl ether), and the like.

The aliphatic alcohols, such as for example, isopropanol, butanol, hexanol and decanol, can also-be used. Further, various hydrocarbon fractions may be utilized with the most preferred being Solvesso 150 or Solvesso 100 (a registered trademark of the Humble Oil and Refining Company.) Aromatic solvents can also be employed, for example, toluene, xylene, cumene, and ethyl benzene.

Preferably, no solvents are employed. However, if used, the solvent choice will be dependent on the monomer composition and can be readily determined without undue experimentation.

Other components that may be employed in the reaction mixture, but which are not necessary and which may be substantially absent, include (i) chain transfer agents, (ii) other polymers or (iii) other macromers. The use of such additional components is well known to those skilled in the art and thus elaboration thereon is not deemed necessary.

The process of this invention is intended to be carried out in a reactor in which continuous mixing can be achieved. Suitable reactors include those in which thorough mixing of the reactor contents occurs. Examples of suitable reactors are the continuous stirred tank reactor (CSTR), the continuous loop reactor, and a tube reactor, e.g., a plug-flow reactor. In addition, continuous mixing can be achieved using a semibatch reactor in which monomer is fed to the reactor over a period of time. Other possible continuous reactor configurations include multiple CSTRs, a CSTR combined with a tube reactor, multiple loop reactors and a loop reactor in combination with a tube reactor. The desired mixing in a tube reactor may be achieved using a static mixer, e.g., complex baffles or by extrusion means. If a CSTR is employed, the reactor is typically provided with at least one vaned agitator driven by an external power source, such as a motor, capable of mixing the reactor contents. The reactor is also provided with a means for controlling the temperature of the reactor contents, e.g., a reactor jacket in which a heating/cooling fluid circulates, controlled by a suitable temperature controller.

The pressure of the reactor contents typically varies from about 25 psig (172 kPag) to about 1000 psig (6895 kPag). Preferably, the pressure of the reactor contents is in the range from about 50 psig (344 kpag) to about 600 psig (4137 kPag), and most preferably from about 50 (344 kPag) psig to about 300 psig (2068 kPag).

An exemplary reactor with support equipment that may be used in this invention is shown in FIG. 1. The 500 ml jacketed, stainless steel, continuous stirred tank reactor (CSTR) 2 may be initially filled with solvent used to remove the product of the previous run. Monomer is fed into the CSTR from monomer feed tank 1 via piping 11, feed pump 30, and piping 12. The monomer feed is typically maintained at ambient temperature, although the feed could be heated or cooled to heat transfer if desired. Generally it will be desirable to heat the feed since the reaction mixture or charge will be heated, although the temperature to which the feed is heated should be controlled to avoid premature polymerization. The monomer feed preferably enters the reaction mixture below the surface and in the vicinity of a magnetic drive agitator through a tube with an outside diameter of about 1/16 inch (0.16 cm). Preferably, a small flow of nitrogen is maintained on the agitator shaft to prevent polymer from migrating up the shaft. Hot oil circulates through the CSTR jacket to provide temperature control, exiting via piping 13, hot oil pump 31, piping 14, hot oil furnace 3, and piping 15. Temperature controller 41 monitors the temperatures of the reactor contents and the reactor jacket, and operates control valve 51 so as to maintain a predetermined reaction temperature by dividing flow of the heated oil through piping 16 and 19, and through piping 17, cooler 4, and piping 18 and 19 into the CSTR jacket. A portion of the reaction mixture exits the reactor from the top through piping 20, passing through control valve 52, which is operated by pressure controller 42 so as to maintain a predetermined pressure in the CSTR. Control valve 53 is operated to divert a small portion of the flow through piping 21 for sampling. If desired, the process may employ a sampling tank 5 that is maintained under vacuum by pulling a vacuum through condenser 6 which has an outlet to tank 7 for collection of the distillate formed in the condenser 6. The combined weight of the macromer collected in tank 5 and the distillate collected in tank 7 may be used to calculate a total mass balance on the system.

Yet another reactor with support equipment that may be used in this invention is shown in FIG. 2. The 300 ml electrically-heated continuous stirred tank reactor (CSTR) 2 may be initially filled with solvent used to remove the product of the previous run. In this reactor system, monomer is fed into the CSTR from monomer feed tank 1 via piping 11, control valve 50, piping 12, feed pump 30, and piping 14. The monomer feed enters the reaction mixture below the surface and in the vicinity of a magnetic drive agitator through a tube with an outside diameter of about 1/16 inch (0.16 cm). Preferably, a small flow of nitrogen is maintained on the agitator shaft to prevent polymer from migrating up the shaft. A portion of the reaction mixture exits the reactor from the top through piping 15, passing through control valve 51, which is operated by pressure controller 40 so as to maintain a predetermined pressure in the CSTR. Product leaving control valve 51 enters storage tank 4 via piping 16. Piping sections 15 and 16 are heated to facilitate transfer of product.

While several embodiments of continuous stirred tank reactor systems have been described above for use in the process of this invention, this is in no way limiting as to the variations of polymerization reactor systems that may be employed. For example, variations, such as reactant feed sequences, reactor size and temperature control means, which are well known to those skilled in the art can be readily employed in the process of this invention.

The examples which follow are intended as illustrations of certain preferred embodiments of the invention, and no limitation of the invention is implied.

EXAMPLE 1

Preparation of Styrene Homomacromers Effects of Residence Time and Temperature

Styrene (100%) was polymerized at various temperatures using the equipment described in FIG. 1. The reactor was operated with various average reactor residence times. For each example, the reactor was filled with Carbitol, which had been used for cleaning in the previous run, and heated to the reaction temperature. The monomer feed was then fed to the reactor at a flow rate necessary to obtain the desired residence time, and the temperature allowed to come to a steady state. The process was kept at a steady state condition for at least 4 residence times before sampling. The residence time, number average molecular weight ($M_n$), the weight average molecular weight ($M_w$), and the DB/chain are displayed in Tables 1, 2, and 3 for reactions run at 288° C., 316° C., and 343° C., respectively. $M_n$ and $M_w$ were determined by gel permeation chromatography using a high performance liquid chromatograph (P E Nelson GPC/SEC Data System in combination with a Waters 410 Differential Refractometer, a Waters 510 HPLC pump and two Polymer Labs Plgel 10 μm mixed bed 300×7.5 mm size exclusion columns). DBEQ was measured via an alkene assay by Wij's titration, in which excess ICl in acetic acid and excess KI were added to a sample of the macromer, and the excess iodine was back-titrated with $Na_2SO_3$. DB/chain was then calculated from $M_n$ and DBEQ.

TABLE 1

288° C., 0% initiator

| Example | Res. Time (minutes) | $M_n$ | $M_w$ | DB/chain |
|---------|---------------------|-------|-------|----------|
| 1A | 30 | 1060 | 1831 | 0.555 |
| 1B | 60 | 872 | 1411 | 0.655 |
| 1C | 90 | 718 | 1086 | 1.052 |

TABLE 2

316° C., 0% initiator

| Example | Res. Time (minutes) | $M_n$ | $M_w$ | DB/chain |
|---------|---------------------|-------|-------|----------|
| 1D | 10 | 873 | 1365 | 0.882 |
| 1E | 15 | 763 | 1108 | 0.858 |
| 1F | 30 | 614 | 802 | 0.628 |
| 1G | 60 | 535 | 659 | 0.633 |

TABLE 3

343° C., 0% initiator

| Example | Res. Time (minutes) | $M_n$ | $M_w$ | DB/chain |
|---------|---------------------|-------|-------|----------|
| 1H | 10 | 532 | 658 | 0.953 |
| 1I | 15 | 478 | 563 | 0.745 |
| 1J | 30 | 431 | 484 | 0.477 |
| 1K | 60 | 399 | 440 | 0.341 |

Comparison of data from all three tables shows that the values of both $M_n$ and $M_w$ decrease with increasing temperature at the same residence time. Data in each table show that the values of both $M_n$ and $M_w$ decrease with increasing residence time. At 288° C., DB/chain increases with residence time,, rising to 1.052 at a residence time of 90 minutes. In contrast, at 316° C. and 343° C., DB/chain decreases with increasing residence time.

EXAMPLE 2

Preparation of a Styrene Homomacromer with Initiator (DTBP)

Styrene was polymerized at 316° C. in the equipment shown in FIG. 1. Varying levels of DTBP (di-tert-butyl peroxide) were added along with the styrene as a polymerization initiator. The reactor was operated with a 15 minute average reactor residence time. The process was kept at a steady state condition for at least 4 residence times before sampling. The DTBP level, the number average molecular weight ($M_n$), the weight average molecular weight ($M_w$), and the DB/chain are set forth in Table 4.

TABLE 4

316° C., 15 minute residence time

| Example | Styrene (% w/w) | DTBP (% w/w) | $M_n$ | $M_w$ | DB/chain |
|---------|-----------------|--------------|-------|-------|----------|
| 2A | 100 | 0.0 | 733.6 | 1077 | 0.91 |
| 2B | 99.5 | 0.5 | 696.6 | 989.4 | 0.816 |
| 2C | 99.0 | 1.0 | 685.7 | 955.4 | 0.908 |

These data show that addition of DTBP tended to decrease both $M_n$ and $M_w$. The effect of initiator is complex. Without being bound to theory, it is believed that when the initiator is added to styrene, which is thermally initiating, the conversion of styrene is increased (thus reducing the concentration of styrene) and thereby lowering the thermal initiation of styrene. As a result, while it is believed that generally an increase in initiator would be expected to lower the DB/chain value because of increased termination, this may not always result when an initiator is added to a system containing a thermal initiator such as styrene.

EXAMPLE 3

Preparation of a Styrene Homomacromer with Initiator (TBHP)

Styrene was polymerized at 343° C. in the equipment shown in FIG. 1. Varying levels of TBHP (tertiary butyl hydroperoxide) were added along with the styrene as a polymerization initiator. The reactor was operated with a 15 minute average reactor residence time. The process was kept at a steady state condition for at least 4 residence times before sampling. The TBHP level, the number average molecular weight ($M_n$), the weight average molecular weight ($M_w$), and the DB/chain are set forth in Table 5.

TABLE 5

343° C., 15 minute residence time

| Example | Styrene (% w/w) | TBHP (% w/w) | $M_n$ | $M_w$ | DB/chain |
|---------|-----------------|--------------|-------|-------|----------|
| 3A | 100 | 0.0 | 484.7 | 595.9 | 0.775 |
| 3B | 99.5 | 0.5 | 471.2 | 558.2 | 0.765 |
| 3C | 99.0 | 1.0 | 470.4 | 556 | 0.743 |
| 3D | 98.0 | 2.0 | 463 | 544.3 | 0.728 |

These data show a slight decrease in both $M_n$ and $M_w$ with increasing TBHP, similar to that observed for DTBP in Example 2. However, DB/chain shows a steady decrease with TBHP level at 343° C., unlike that exhibited with the DTBP initiator at 316° C., although the decrease is very gradual.

EXAMPLE 4

Preparation of Styrene/Acrylic Comacromers

Several comacromers were prepared by polymerizing styrene in a reactor similar to that described in FIG. 1 with either methylmethacrylate (MMA), acrylic acid (AA) or hydroxyethylmethacrylate (HEMA). In each case the monomer mixture consisted of 70 wt. % styrene and 30 wt. % co-monomer and the reaction temperature was varied between 316° C. and 343° C. In addition, the initiator level (DTBP) was varied between 0 and 0.5 wt.

EXAMPLE 5

Preparation of Poly(butyl acrylate) Homomacromer (Reaction Temp. 285° C.)

N-Butyl acrylate (BA) was polymerized using the apparatus illustrated in FIG. 2. First, 6000 g of BA (100 wt. parts) and 30 g DTBP (0.5 wt. parts) were added to the monomer feed tank. A solvent (Carbitol) was fed to the reactor from the solvent tank to fill the reactor. Next, the temperature of the reactor was elevated to 225° C. and the pressure in the reactor was maintained at about 24 to 26 kg/cm². G by means of a pressure controller. The monomer feed was then fed to the reactor at a rate of 22 g/min. The reactor was operated with a 13.6 minute average reactor residence time. The reaction temperature was maintained at about 285° C. The process was kept at a steady state condition for at least one hour before sampling. The number of terminal double bonds per chain (TDB/chain) was measured using $^1$H NMR spectroscopy. The broad signal at δ=4 ppm was due to the methylene adjacent to the carboxyl oxygen, and the signals at δ=5.5 and δ=6.1 ppm were due to the terminal double bond. The ratio of the area due to the double bond and the area due to the methylene is multiplied by $P_n$ to obtain TDB/chain. The temperature, the DTBP level, the number average molecular weight ($M_n$), the weight average molecular weight ($M_w$) ($M_n$ and $M_w$ were determined by Gel Permeation Chromatography), and the TDB/chain are set forth below in Table 6.

EXAMPLE 6

Preparation of Poly(butyl acrylate) Homomacromer (Reaction Temp. 315° C.)

A poly(butyl acrylate) homomacromer was prepared in a manner similar to Example 5, with the exception that the reaction temperature was about 315° C. and the residence time was 12 minutes. The $M_n$, $M_w$ and TDB/chain data are set forth in Table 6.

TABLE 6

| Example | Temp (° C.) | % DTBP | $M_n$ | $M_w$ | TDB/chain |
|---|---|---|---|---|---|
| 5 | 285 | 0.5 | 1540 | 3000 | 0.71 |
| 6 | 315 | 0.5 | 1300 | 2570 | 0.95 |

EXAMPLE 7

Preparation of an Acrylic Comacromer

An acrylic comacromer was prepared in a manner substantially similar to that set forth in Example 6, with the exception that the 79.97% w/w butyl acrylate, 19.99% w/w acrylic acid and 0.04% w/w DTBP were employed. The $M_n$, $M_w$ and TDB/chain data for the resulting comacromer are set forth in Table 7.

EXAMPLE 8

Preparation of an Acrylic Comacromer

An acrylic comacromer was prepared in a manner substantially similarly to that of Example 7, with the exception that the reaction temperature was 295° C. The $M_n$, $M_w$ and TDB/chain data for the resulting comacromer are set forth in Table 7.

TABLE 7

| Example | Temp (° C.) | DTBP (% w/w) | $M_n$ | $M_w$ | TDB/chain |
|---|---|---|---|---|---|
| 7 | 315 | 0.04 | 1450 | 2920 | 0.85 |
| 8 | 295 | 0.04 | 1810 | 3790 | 0.97 |

EXAMPLE 9

Preparation of Acrylic Comacromer

A comacromer was prepared in a manner substantially similar to Example 5 by polymerizing 67.6% w/w hexyl acrylate, 19.35% w/w hydroxyethyl acrylate, and 9.7% w/w hydroxyethyl methacrylate in the presence of 2.5% w/w isopropyl alcohol and 1% w/w DTBP at a reaction temperature of 270° C. for a 12 minute residence time. The $M_n$, $M_w$ and TDB/chain data for the resulting comacromer are set forth in Table 8.

EXAMPLE 10

Preparation of Styrene Homomacromer in a Tube Reactor

Styrene homomacromer were prepared in a tube reactor that consisted of a ¹⁄₁₆ inch (0.16 cm) outer diameter (OD) stainless steel tube immersed in a 600 ml pressure reactor filled with MAROLOTHERM™ SH (Huls) heat transfer oil. The 600 ml reactor was heated with an electric heating mantle. The oil was heated to the desired reaction temperature and the monomer subsequently pumped through the tube. The residence time was varied by changing the monomer feed rate or the length of the tube immersed in the oil or both. The pressure in the tube was controlled at the desired setpoint by a pressure control value at the tube outlet. In all cases the pressure was maintained in the tube reactor between about 550–600 psia (3792–4137 kpaa). The monomer feed was 100% styrene. The various reaction temperatures and residence times along with the $M_n$, $M_w$ and DB/chain for the resulting styrene homomacromers is set forth in Table 8 below.

TABLE 8

| Example | Temp. (° C.) | Residence Time (min.) | $M_n$ | $M_w$ | DB/chain |
|---|---|---|---|---|---|
| 9 | 270 | 12 | 1900 | 2920 | 0.75 |
| 10A | 343 | 6.33 | 794 | 2640 | 1.1 |
| 10B | 343 | 10.06 | 740 | 2600 | 1.2 |
| 10C | 343 | 15.1 | 700 | 2675 | 1.2 |
| 10D | 343 | 15.1 | 706 | 2710 | 0.9 |
| 10E | 371 | 6.33 | 495 | 1285 | 1.1 |
| 10F | 371 | 10.06 | 463 | 1190 | 1.0 |
| 10G | 371 | 15.1 | 447 | 1205 | 0.8 |
| 10H | 371 | 15.1 | 460 | 1290 | 0.9 |

EXAMPLE 11

(A) Preparation of Terminally Unsaturated Hydroxyethyl Methacrylate/Styrene Comacromer A mixture of styrene (99.0% w/w) and 2-hydroxyethyl methacrylate (HEMA) (1.0% w/w) was fed into an empty 10 gallon (37.9 liter) stainless steel reactor with agitation and the reactor jacket was set at 321° C. The mixture was fed at a rate of 3 lbs/min. (1.36 kg/min.) until 46 lbs (20.9 kg) had been added, at which point the reactor bottom was opened to allow the product out of the reactor at a rate which maintained a constant level of polymerizable reactant in the reactor resulting in a 15 minute residence time. The comacromer was continuously fed to a wiped film evaporator having a temperature of 263° C. and under a pressure of 4.9 psia (33.8 kPaa). The resulting comacromer product was then pumped out of the evaporator and collected.

(B) Use of the HEMA/Styrene Comacromer as a Reactive Substrate for Reaction with Acrylic Acid (i) A 50/50 (wt) mixture of HEMA/styrene comacromer prepared above and toluene was prepared. Approximately 40.75 lbs (18.5 kg) of this mixture was pumped into the reactor described above. The reactor was heated to 165° C. and 9.2 lbs (4.2 kg) of a mixture of acrylic acid (96:750% w/w) and DTBP (3.25% w/w) was fed to the reactor at a rate of 0.308 lbs/min (0.14 kg/min.). The reactor temperature was raised to 260° C. and held for 60 minutes. The polymerized mixture was then pumped to a wiped film evaporator set at 232° C. and approximately 5–8 psia (34.5–55.2 kpaa) at a rate of approximately 2.5 lbs/min (1.13 kg/min.) The resulting acrylic grafted comacromer was pumped out of the evaporator and collected. The acid number, percent acrylic acid (AA) conversion, $M_n$, $M_w$ and polydispersity (Pd) are set forth in Table 9.

(ii) A 50/50 (wt) mixture of the HEMA/styrene comacromer prepared above and toluene was added to the reactor (42 lbs/19.1 kg). The reactor was heated to 165° C. and 8.9 lbs (4 kg) of a mixture of acrylic acid (96.85% w/w) and DTBP (3.15% w/w) was fed to the reactor at a rate of 0.29 lbs/min (0.13 kg/min.). The reactor temperature was raised to 200° C. and held for 60 minutes. The polymerized mixture was then pumped to the film evaporator under the same conditions described above and the acrylic grafted comonomer collected. The acid number, percent acrylic acid conversion, $M_n$, $M_w$, and Pd are set forth in Table 9.

(iii) The grafted comacromer produced in Example 11(B) (i) (10 lbs/4.5 kg) and the comacromer produced in Example 11(A) (20 lbs/9.1 kg) was added to the 10 gallon (37.9 liter) reactor described above. The reactor was heated to 176° C. to melt the components and them the temperature was reduced to 165° C. Next, 17.5 lbs (7.9 kg) of a mixture of acrylic acid (49.2% w/w), acetone (49.2% w/w) and DTBP (1.6% w/w) was fed to the reactor at a rate of 0.58 lbs/min (0.26 kg/min.). This was followed by the addition of 7.28 lbs (3.3 kg) of acetone to the reactor to maintain an open feed line. The reactor was then heated to 200° C. and held for 60 minutes. The polymerized mixture was then pumped to the film evaporator under the conditions described above and the grafted comacromer product was collected. The acid number, percent acrylic acid conversion, $M_n$, $M_w$, and Pd are set forth in Table 9.

TABLE 9

| Example | Acid # | AA Conversion | $M_n$ | $M_w$ | Pd |
|---------|--------|---------------|-------|-------|------|
| 11B(i)  | 113    | 98%           | 940   | 1505  | 1.67 |
| 11B(ii) | 67.4   | 73.4%         | 1130  | 1900  | 1.69 |
| 11B(iii)| 143.6  | 78.9%         | 1375  | 2745  | 2.0  |

(C) Use of the Grafted Comacromer as a Surfactant in an Emulsion Polymerization

A resin solution was prepared by adding 420 g of the graft comacromer (11B(iii)) to 1000 g of deionized water with agitation. Next, 70 g of ammonia (28%) was added. This mixture was heated to 85° C. and mixed for 30 minutes to dissolve the resin. Then 301.3 g of the resin solution and 93.8 g of deionized water were added to a 1 liter flask fitted with paddle agitators and a heating mantle. This mixture was heated to 82° C. with agitation. Next, 7.64 g of a 20% ammonia persulfate solution in water was added and the reactor contents held for 10 minutes. This was followed by the addition of 118.8 g of styrene at a constant rate over 35 minutes while maintaining the reactor temperature at 82° C. The emulsion polymerized mixture was then held for 60 minutes at 82° C. The resulting emulsion polymer had a number average particle size of 48 nanometers and a weight average particle size of 75 nanometers. The emulsion viscosity was 1690 cps (1.69 pascal seconds) with a solids level of 39.76% and a pH of 8.36.

In addition to other uses for low molecular weight comacromers made by the process of this invention, such products may also find use as reactive surface active agents ("surfactants") when the products have a combination of hydrophobic groups with a sufficient amount of ionic groups or ionizable groups to render the comacromer sufficiently dispersible or emulsifiable in water to act as a surfactant which surfactant can then be reacted into an addition polymer because of the presence of unsaturated groups.

Other variations and modifications of this invention will be obvious to those skilled in the art. This invention is not limited except as set forth in the claims.

What is claimed is:

1. A continuous process for preparing an acrylic comacromer comprising:
   (a) charging a reactor with a monomer feed comprising monomers consisting essentially of at least two different acrylic monomers to form a polymerizable reaction charge; and
   (b) heating the reaction charge in the reactor to a reaction temperature that ranges from about 315° C. to about 500° C. for a residence time greater than 5 minutes and less than 60 minutes to form the comacromer, wherein the continuous process produces the acrylic comacromer and the acrylic comacromer has a number average molecular weight of from about 300 to about 5,000.

2. The process of claim 1, wherein the reactor is a continuous stirred tank reactor, a continuous loop reactor or a tube reactor.

3. The process of claim 1, wherein the acrylic monomers are acrylates, methacrylates, or mixtures thereof.

4. The process of claim 1, wherein the reaction charge further comprises up to about 3% by weight of a free radical polymerization initiator based on the total weight of the acrylic monomers.

5. The process of claim 1, wherein the residence time is from about 10 to 45 minutes.

6. The process of claim 1, wherein the acrylic monomers are selected from the group consisting of n-butyl acrylate, acrylic acid, methacrylic acid, methyl acrylate, ethyl acrylate, propyl acrylate, 2-ethylhexyl acrylate, ethyl methacrylate, propyl methacrylate, n-butyl methacrylate, 2-ethylhexyl methacrylate, cyclohexyl methacrylate, isopropyl acrylate, methyl methacrylate, hexyl acrylate, hydroxyethyl acrylate, hydroxypropyl methacrylate, hydroxymethyl methacrylate, hydroxybutyl methacrylate, and hydroxyethyl methacrylate.

7. The continuous process of claim 1, wherein the residence time is about 12 minutes.

8. The continuous process of claim 1, wherein one of the at least two different acrylic monomers is hexyl acrylate and the other of the at least two different acrylic monomers is selected from the group consisting of hydroxyethyl methacrylate, hydroxyethyl acrylate, and combinations thereof.

9. The continuous process of claim 1, wherein one of the at least two different acrylic monomer is butyl acrylate.

10. The continuous process of claim 1, wherein the acrylic monomers are selected from the group consisting of methyl acrylate, ethyl acrylate, n-propyl acrylate, isopropyl acrylate, n-butyl acrylate, 2-ethylhexyl acrylate, n-decyl acrylate, 2-hydroxyethyl acrylate, methacrylic acid, methyl methacrylate, ethyl methacrylate, n-propyl methacrylate, isopropyl methacrylate, n-butyl methacrylate, isobutyl methacrylate, sec-butyl methacrylate, t-butyl methacrylate, n-amyl methacrylate, isoamyl methacrylate, n-hexyl methacrylate, 2-ethylhexyl methacrylate, benzyl methacrylate, 2-n-butoxyethyl methacrylate, 2-chloroethyl methacrylate, allyl methacrylate, cyclohexyl methacrylate, 2-hydroxethyl methacrylate, 2-hydroxypropyl methacrylate, N,N-dimethylaminoethyl methacrylate, N,N-diethylaminoethyl methacrylate, acrylamide, N-ethylacrylamide, N,N-diethylacrylamide, methacrylamide, N-methylmethacrylamide, N-ethylmethacrylamide, N,N-dimethylmethacrylamide, N,N-diethylmethacrylamide, 3-chloro-2-hydroxypropyl acrylate, 2-hydroxybutyl acrylate, 6-hydroxyhexyl acrylate, 2-hydroxypropyl methacrylate, 6-hydroxyhexyl methacrylate, 5,6-dihydroxyhexyl methacrylate, methyl-α-chloroacrylate, methyl 2-cyanoacrylate, t-butylaminoethyl methacrylate, 2-sulfoethyl methacrylate, trifluoroethyl methacrylate, 2-ethylbutyl methacrylate, cinnamyl methacrylate, cyclopentyl methacrylate, 2-ethoxyethyl methacrylate, furfuryl methacrylate, hexafluoroisopropyl methacrylate, 3-methoxybutyl methacrylate, 2-methoxybutyl methacrylate, 2-nitro-2-methylpropyl methacrylate, n-octyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, and acrylonitrile.

11. The continuous process of claim 1, wherein the acrylic monomers are selected from the group consisting of methacrylic acid, esters of acrylic acid, and esters of methacrylic acid.

12. The continuous process of claim 1, wherein the acrylic monomers are selected from the group consisting of n-butyl acrylate, methacrylic acid, methyl acrylate, ethyl acrylate, propyl acrylate, 2-ethylhexyl acrylate, ethyl methacrylate, propyl methacrylate, n-butyl methacrylate, 2-ethylhexyl methacrylate, cyclohexyl methacrylate, isopropyl acrylate, methyl methacrylate, hexyl acrylate, hydroxyethyl acrylate, hydoxypropyl methacrylate, hydroxymethyl methacrylate, hydroxybutyl methacrylate, and hydroxyethyl methacrylate.

13. The process of claim 1, wherein the reaction charge comprises a solvent.

* * * * *